US011994647B2

(12) United States Patent
Mamtimin et al.

(10) Patent No.: US 11,994,647 B2
(45) Date of Patent: May 28, 2024

(54) COMPENSATED FORMATION SATURATION USING ASSISTED PHYSICS AND NEURAL NETWORKS

(71) Applicant: HALLIBURTON ENERGY SERVICES, INC., Houston, TX (US)

(72) Inventors: Mayir Mamtimin, Spring, TX (US); Jeffrey James Crawford, Katy, TX (US); Weijun Guo, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 429 days.

(21) Appl. No.: 17/550,588

(22) Filed: Dec. 14, 2021

(65) Prior Publication Data
US 2023/0184989 A1 Jun. 15, 2023

(51) Int. Cl.
*G01V 5/10* (2006.01)
(52) U.S. Cl.
CPC .................................. *G01V 5/101* (2013.01)
(58) Field of Classification Search
CPC .......... G01V 5/10; G01V 5/105; G01V 5/102; G01V 5/104; G01V 5/145; E21B 2200/22; E21B 49/00; E21B 47/00; G01N 9/24; G01T 1/208
See application file for complete search history.

(56) References Cited

U.S. PATENT DOCUMENTS

| 5,808,298 | A | 9/1998 | Mickael |
| 6,028,307 | A | 2/2000 | Young et al. |
| 2013/0048849 | A1 | 2/2013 | Li et al. |
| 2015/0285944 | A1 | 10/2015 | Herron et al. |
| 2019/0383962 | A1 | 12/2019 | Zhou et al. |
| 2022/0171087 | A1* | 6/2022 | Mamtimin ............. G01V 5/101 |

OTHER PUBLICATIONS

International Search Report & Written Opinion; PCT Application No. PCT/US2022/011958; mailed Aug. 30, 2022.

* cited by examiner

*Primary Examiner* — Don K Wong
(74) *Attorney, Agent, or Firm* — NOVAK DRUCE CARROLL LLP (57) ABSTRACT

Aspects of the subject technology relate to determining holdup compensated formation saturation while refraining from calculating holdup. Inelastic gamma spectrum data for an inelastic gamma spectrum generated downhole in a wellbore can be accessed. Further, capture gamma spectrum data for one or more capture gamma spectrums generated downhole in the wellbore can be accessed. A model that accounts for holdup measurement can be applied to both the inelastic gamma spectrum data and the capture gamma spectrum data to identify a compensated oil saturation for a formation surrounding at least a portion of the wellbore based on both the inelastic gamma spectrum and the one or more capture gamma spectrums.

20 Claims, 8 Drawing Sheets

COMPENSATED FORMATION SATURATION USING ASSISTED PHYSICS AND NEURAL NETWORKS

FIELD

Various aspects of the subject technology relate to determining holdup compensated formation saturation while refraining from calculating holdup and, in particular, to determining holdup compensated formation saturation from both inelastic gamma spectrums and capture gamma spectrums.

BACKGROUND

In nuclear measurements, gamma detectors are often used to extract both characteristic energies and intensity of gamma emissions from nuclear interactions of interest. In operation, gamma detectors absorb the incident gamma energy and generate electric pulses from Compton scattering, photoelectric, and pair-production mechanisms. In a gamma response, the electric pulse height, e.g. during a pulse mode of operation, corresponds to the gamma energy and the detection rate corresponds to the counting intensity or count rate. In principle, every energy channel and count rates contain useful information that describes specific nuclear interactions.

One objective of nuclear well logging is to identify hydrocarbon saturation of the formation matrix using neutron induced gamma measurements. Pulsed neutron log ("PNL") inelastic measurements have been used to extract elemental concentrations of carbon and oxygen to deduce formation saturation. However, it is challenging to accurately calculate formation saturation while a borehole fluid contains carbon. Specifically, borehole holdup is measured using production logging tools and its effect is subtracted by environmental correction to accurately pinpoint formation saturation. This can be done by using PNL inelastic measurement to calculate borehole holdup as the first step to correct formation saturation analysis. However, the steps of calculating borehole holdup and correcting a measurement based on such calculated holdup can introduce errors and increase the overall complexity of such measurement techniques. Holdup, as used herein, refers to the volumetric ratios of oil, water, and gas in a borehole.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts can be exaggerated to better illustrate details and features of the present disclosure.

As discussed previously, traditional formation saturation techniques that rely on calculating holdup and then correcting for the holdup are complex and introduce a number of steps that can ultimately affect the accuracy of compensated oil saturation measurements.

The disclosed technology addresses the foregoing by determining holdup compensated formation saturation while refraining from calculating holdup. More specifically, the disclosed technology relates to determining holdup compensated formation saturation from both inelastic gamma spectrums and capture gamma spectrums.

Some aspects of the disclosed technology can be utilized in downhole tools for logging while drilling (LWD) applications. However, as will be discussed in further detail, other types of environments including measurement while drilling (MWD) or wireline wellbore environments are similarly applicable.

Figure 1A:
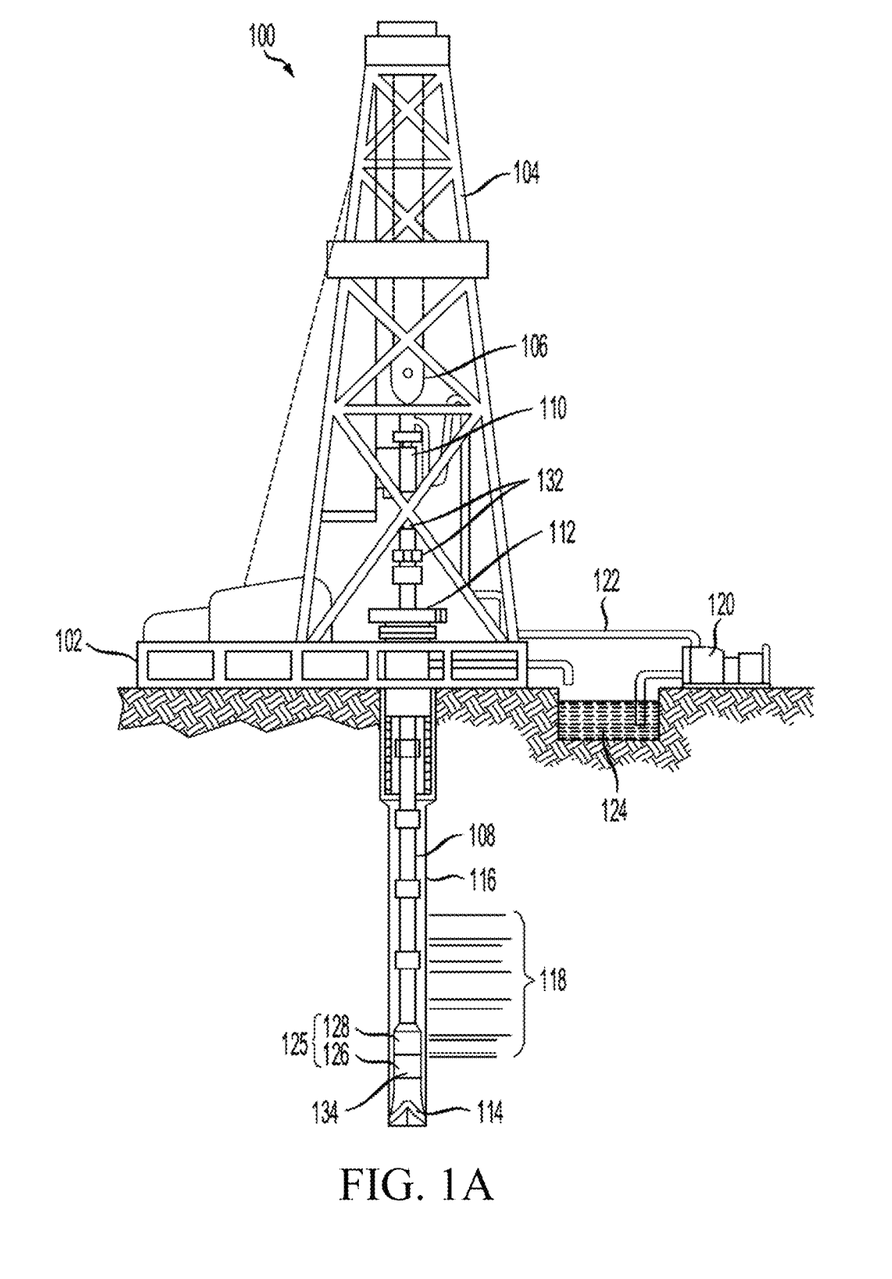
FIG. 1A is a diagram of an example downhole environment, in accordance with various aspects of the subject technology.

Referring to FIG. 1A, a diagrammatic view illustrates an exemplary wellbore drilling environment 100, for example a logging while drilling (LWD) and/or measurement while drilling (MWD) wellbore environment, in which the present disclosure can be implemented. As illustrated in FIG. 1A, a drilling platform 102 is equipped with a derrick 104 that supports a hoist 106 for raising and lowering one or more drilling components 132 which can include, for example, a drill string 108 which can include one or more drill collars 134, a drill bit 114, and/or a bottom-hole assembly 125. The drilling components 132 are operable to drill a wellbore 116. The drilling components 132 also can include housings for one or more downhole tools. The drilling components 132 can be manufactured from one or more materials including, but not limited to, steel, stainless steel, an alloy, or the like. The material can also be magnetic or non-magnetic.

The hoist 106 suspends a top drive 110 suitable for rotating the drill string 108 and lowering the drill string 108 through a well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to the top drive 110, down through the interior of the drill string 108, through orifices in the drill bit 114, back to the surface via the annulus around the drill string 108, and into a retention pit 124. The drilling fluid transports cuttings from the wellbore 116 into the pit 124 and aids in maintaining the integrity of the wellbore 116. Various materials can be used for drilling fluid, including oil-based fluids and water-based fluids.

As illustrated in FIG. 1A, sensors 126 can be provided, for example integrated into the bottom-hole assembly 125 near the drill bit 114. The sensors 126, in another example, can be integrated into a drill collar of a pressure sleeve system. As the drill bit 114 extends the wellbore 116 through the formations 118, the sensors 126 can collect measurements of various drilling parameters, for example relating to various formation properties, the orientation of the drilling component(s) 132, dog leg severity, pressure, temperature, weight on bit, torque on bit, and/or rotations per minute. The sensors 126 can be any suitable sensor to measure the drilling parameters, for example transducers, fiber optic sensors, and/or surface and/or downhole sensors. The bottom-hole assembly 125 can also include a telemetry sub 128 to transfer measurement data to a surface receiver 130 and to receive commands from the surface. In some examples, the telemetry sub 128 communicates with a surface receiver 130 using mud pulse telemetry. In other examples, the telemetry sub 128 does not communicate with the surface, but rather stores logging data for later retrieval at the surface when the logging assembly is recovered. Notably, one or more of the bottom-hole assembly 125, the sensors 126, and the telemetry sub 128 can also operate using a non-conductive cable (e.g. slickline, etc.) with a local power supply, such as batteries and the like. When employing non-conductive cable, communication can be supported using, for example, wireless protocols (e.g. EM, acoustic, etc.) and/or measurements and logging data can be stored in local memory for subsequent retrieval at the surface.

Each of the sensors 126 can include a plurality of tool components, spaced apart from each other, and communicatively coupled together with one or more wires. The telemetry sub 128 can include wireless telemetry or logging capabilities, or both, such as to transmit information in real time indicative of actual downhole drilling parameters to operators on the surface.

The sensors 126, for example an gamma ray logging tool, can also include one or more computing devices 150 communicatively coupled with one or more of the plurality of drilling components 132. The computing device 150 can be configured to control or monitor the performance of the sensors 126, process logging data, and/or carry out the methods of the present disclosure.

In some examples, one or more of the sensors 126 can communicate with the surface receiver, such as a wired drillpipe. In other cases, the one or more of the sensors 126 can communicate with the surface receiver by wireless signal transmission. In at least some cases, one or more of the sensors 126 can receive electrical power from a wire that extends to the surface, including wires extending through a wired drillpipe. In at least some examples the methods and techniques of the present disclosure can be performed by a controller, for example a computing device, on the surface. In some examples, the controller can be included in and/or communicatively coupled with a surface receiver. For example, the surface receiver of wellbore operating environment 100 at the surface can include one or more of wireless telemetry, processor circuitry, or memory facilities, such as to support substantially real-time processing of data received from one or more of the sensors 126. In some examples, data can be processed at some time subsequent to its collection, wherein the data can be stored on the surface at surface receiver, stored downhole in telemetry sub 128, or both, until it is retrieved for processing.

Figure 1B:
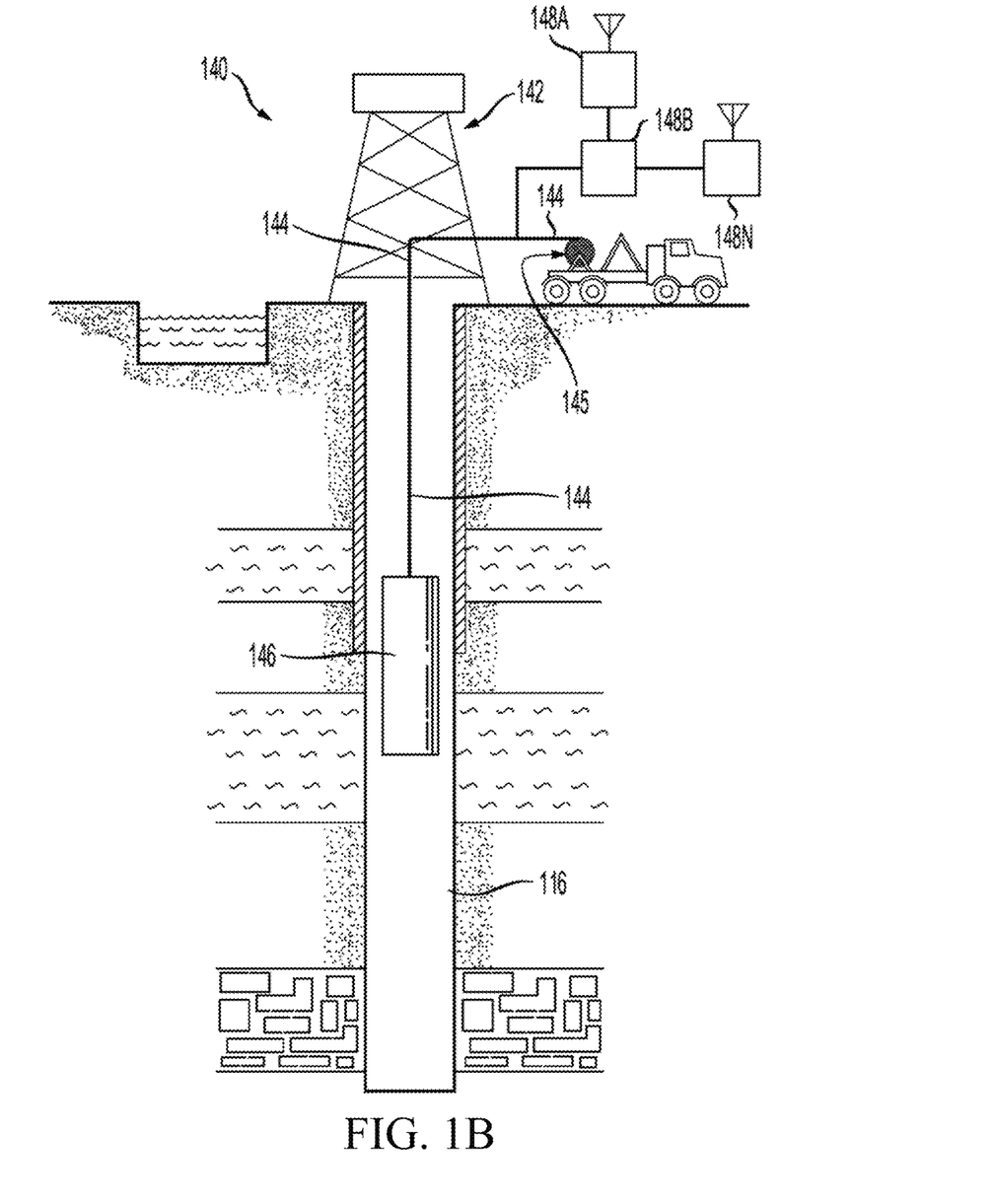
FIG. 1B is a diagram of another example downhole environment, in accordance with various aspects of the subject technology.

Referring to FIG. 1B, an example system 140 for downhole line detection in a downhole environment can employ a tool having a tool body 146 in order to carry out logging and/or other operations. For example, instead of using the drill string 108 of FIG. 1A to lower tool body 146, which may contain sensors or other instrumentation for detecting and logging nearby characteristics and conditions of the wellbore 116 and surrounding formation, a wireline conveyance 144 can be used. The tool body 146 can include a gamma ray logging tool. The tool body 146 can be lowered into the wellbore 116 by wireline conveyance 144. The wireline conveyance 144 can be anchored in a drill rig 145 or a portable means such as a truck. The wireline conveyance 144 can include one or more wires, slicklines, cables, and/or the like, as well as tubular conveyances such as coiled tubing, joint tubing, or other tubulars.

The illustrated wireline conveyance 144 provides support for the tool, as well as enabling communication between tool processors 148A-N on the surface and providing a power supply. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more processors 148A-N, which can include local and/or remote processors. Moreover, power can be supplied via the wireline conveyance 144 to meet power requirements of the tool. For slickline or coiled tubing configurations, power can be supplied downhole with a battery or via a downhole generator.

Figure 2:
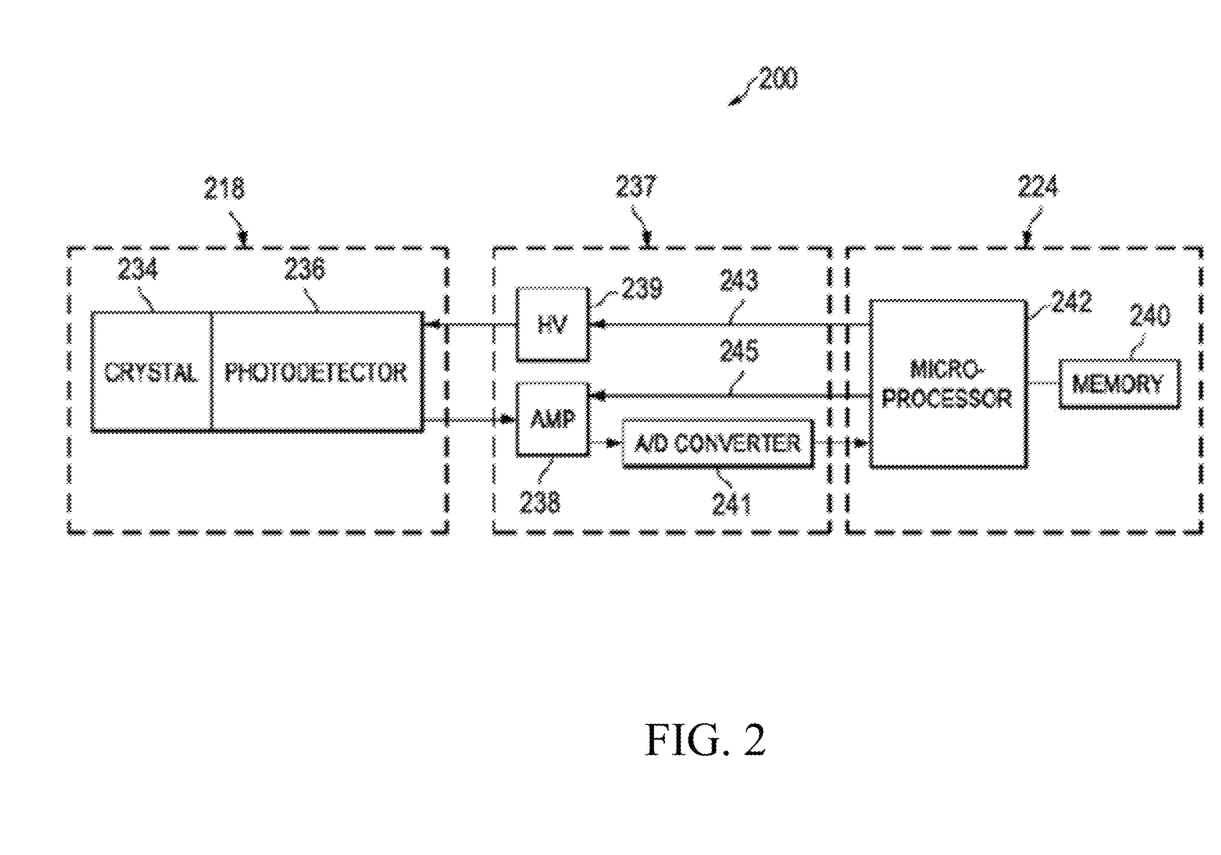
FIG. 2 is a diagram illustrating an example gamma ray detector system, in accordance with various aspects of the subject technology.

FIG. 2 is a diagram illustrating an example gamma ray detector system 200, in accordance with various aspects of the subject technology. The gamma ray detector system 200 includes a downhole gamma ray detector 218, electronics unit 237, and a processing unit 224. The gamma ray detector 218 may be part of a drilling assembly of a downhole tool for logging while drilling, or measuring while drilling operations (see FIG. 1A), or may be a wireline tool for logging an existing well (see FIG. 1B). The gamma ray detector system 200 may include one or more gamma ray detectors, e.g., 2, 3, 4, 5, 6, or more. Each gamma ray detector 218 counts gamma ray energy emitted naturally subsurface, but could also be used for other sources of gamma rays in the wellbore. The gamma ray detectors may be near an exterior of the logging tool and be spaced about a circumference. While multiple gamma ray detectors may be included, only one is explicitly presented here.

The gamma ray detector system 200 can be implemented with one or more radiation sources. Specifically, the gamma ray detector system 200 can include one or more radiation sources for generating gamma spectrums in a formation or material. Further, the gamma ray detector system 200 can be configured to detect gamma spectrums that are generated through one or more radiation sources that are separate from the gamma ray detector system 200. A radiation source for generating gamma spectrums, as used herein, includes an applicable source for generating applicable radiation to cause emission of a gamma ray spectrum. For example, a radiation source can include a neutron generator that is configured to generate high-energy neutrons that cause a formation, in interacting with the high-energy neutrons, to emit gamma rays.

The one or more gamma ray detectors provide signals that scale the energy deposited by the gamma rays. The gamma ray detector 218 includes one or more scintillator crystals 234 for receiving the gamma rays that then create light emissions that influence an adjacent, optically-coupled photodetector 236, e.g., a photomultiplier tube (PMT). The gamma ray detector 218 is electrically coupled to an electronics unit 237. The electronics unit 237 may include an amplifier 238, a variable high voltage supply unit 239, and an analog-to-digital (A/D) converter 241. The high voltage supply unit 239 is coupled to and powers one or more of the gamma ray detectors 218. One power supply 239 may be used to power multiple gamma ray detectors. The high voltage supply 239 or supplies may be configured so that their output voltage can be adjusted by a controller or processor 242 as suggested by 243.

The electronics unit 237 may also include the one or more amplifiers 238 to modify the amplitude of the signals coming from the one or more gamma ray detectors 218. The amplifier 238 may be configured to be adjusted by a controller as suggested by 245. Finally, the electronics unit 237 includes the analog-to-digital (A/D) converter 241 to convert voltage signals to digital signals that may be passed to the processing unit 224. The electronics unit 237 is for converting and processing (e.g., adjusting the signal amplitude or adjusting the voltage supplied to the gamma ray detector) the signals including preparing digital signals.

The processing unit 224 includes one or more memories 240 associated with one or more processors, e.g., microprocessor 242. As is well understood, the one or more memories 240 together with the one or more processors 242 are operable to execute code or otherwise accomplish various functions as desired. The processor 242 may be configured to control the output voltage of the one or more variable high-voltage supplies 239 or the one or more amplifiers 238.

In some embodiments, the processing unit 224 may implement a gamma spectral analysis system for the one or more gamma ray detectors 218. Alternatively, a gamma spectral analysis system can be implemented separate from the processing unit 224 but otherwise functions with the processing unit to perform the techniques described herein. Specifically, The gamma spectral analysis system can gather or otherwise access spectrum data for a gamma spectrum. Additionally, the gamma spectral analysis system can identify compensated oil saturation measurements for a formation from the spectrum data without actually calculating holdup and subsequently compensating for the calculated holdup. More specifically, the gamma spectral analysis system can identify compensated oil saturation measurements from both inelastic gamma spectrums and capture gamma spectrums.

Figure 3:
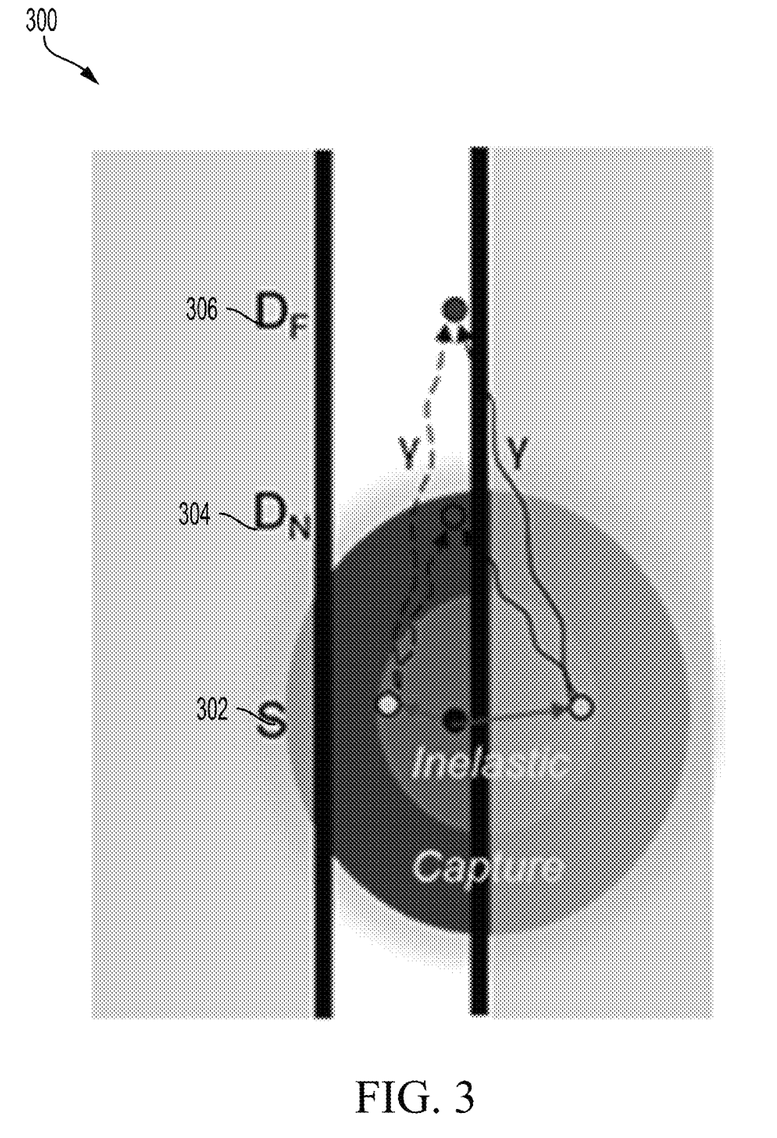
FIG. 3 illustrates a schematic diagram of the operation principles of inducing gamma spectrums in a wellbore environment, in accordance with various aspects of the subject technology.

FIG. 3 illustrates a schematic diagram 300 of the operation principles of inducing gamma spectrums in a wellbore environment. Specifically, gamma spectrums can be generated based on the principles of Gamma energy emission. More specifically, Gammas can be emitted when nucleus deexcites from an elevated energy level to a lower state.

Nuclear excitation can be induced by various methods. For example, and as shown in the diagram 300, a source of radiation 302 can emit radiation, e.g. neutrons, that cause nuclear excitation when the radiation bombards the formation. Regardless of excitation mechanisms, a nucleus deexcites with characteristic gammas (unique gamma energies) due to its quantized energy levels. During this process, a single gamma or a combination of multiple gammas are emitted with corresponding branching ratios (or emission probabilities). When a detector receives these gammas, a cascade of electric pulses is generated. As shown in the diagram 300, the environment includes both a near field detector 304 and a far field detector 306. Depending on the stochastic gamma interaction modes, some pulses correspond to the full energy and others to the partial energy. Gamma spectrum analysis aims to extract qualitative (which nucleus the emission is from) and quantitative (quantity of the target nucleus in the sample) information from the entire spectrum.

As shown in FIG. 3, two different types of gamma spectrums can be created. Specifically, neutron inelastic scatter only occurs when neutron energy is high enough to excite the target nucleus. Thus, this process is only available for fast neutrons. The excited target nucleus relaxes to its ground state by emitting characteristic gamma radiation. This relaxation process is prompt and has no time delay (10-24 s). Thus, inelastic scatter can be measured by the energy and intensity of the emitted gamma or the timing and spatial characteristics of the emitted gammas. The other type of spectrum, capture gamma spectrum, is induced when a neutron is captured by a nucleus.

Figure 4:
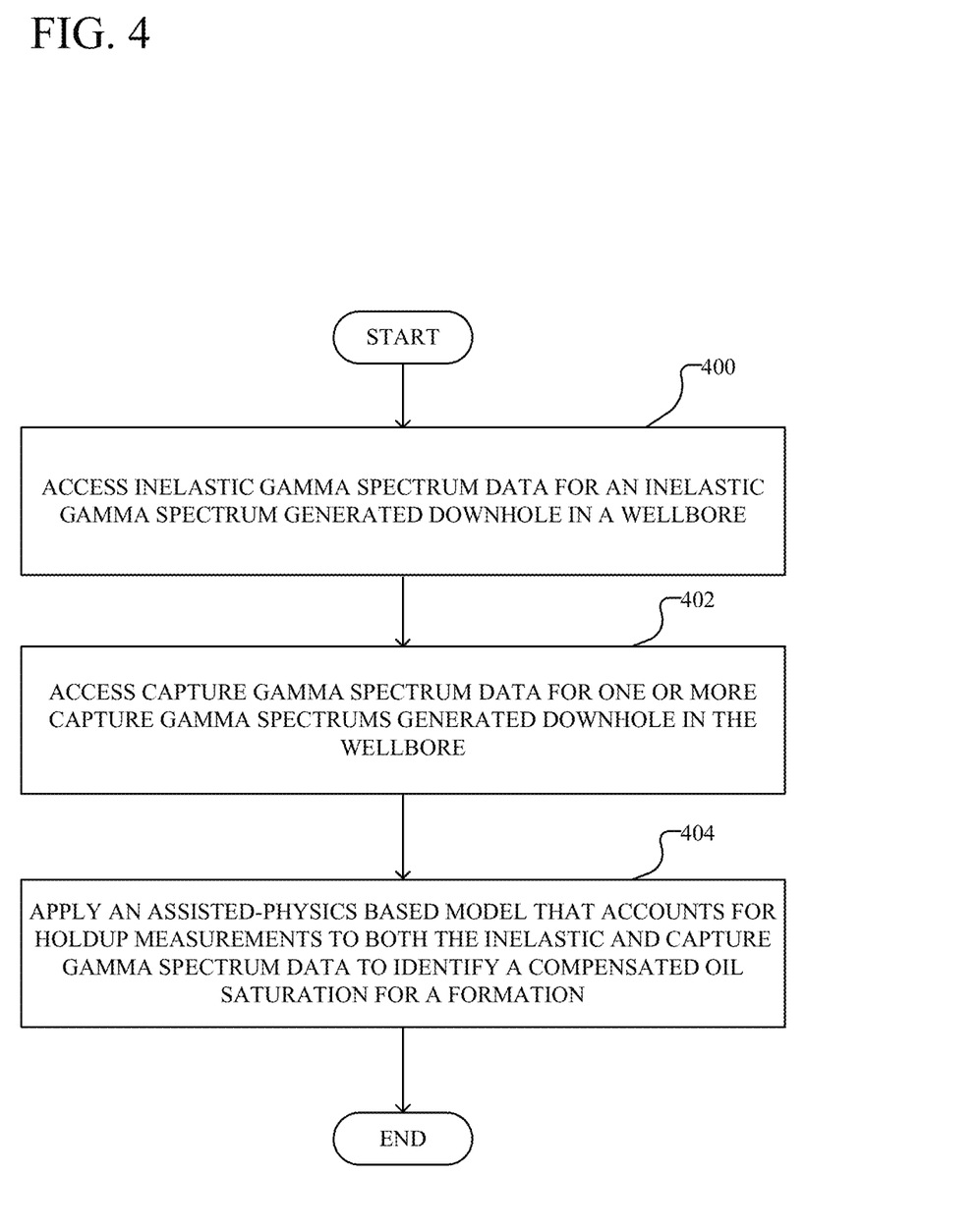
FIG. 4 illustrates a flowchart for an example method of identifying holdup compensated oil saturation for a formation through an assisted-physics based model applied to both inelastic and capture gamma spectrums, in accordance with various aspects of the subject technology.

FIG. 4 illustrates a flowchart for an example method of identifying holdup compensated oil saturation for a formation through an assisted-physics based model applied to both inelastic and capture gamma spectrums, in accordance with various aspects of the subject technology. The method shown in FIG. 4 is provided by way of example, as there are a variety of ways to carry out the method. Additionally, while the example method is illustrated with a particular order of steps, those of ordinary skill in the art will appreciate that FIG. 4 and the modules shown therein can be executed in any order and can include fewer or more modules than illustrated. Each module shown in FIG. 4 represents one or more steps, processes, methods or routines in the method.

At step 400, inelastic gamma spectrum data for an inelastic gamma spectrum generated downhole in a wellbore is accessed. Inelastic gamma spectrum data for a generated inelastic gamma spectrum can include applicable data related to the inelastic gamma spectrum. Specifically, inelastic gamma spectrum data can include raw data of counts per energy channels. Further, inelastic gamma spectrum data can include processed data of an inelastic gamma spectrum, e.g. a filtered inelastic gamma spectrum.

At step 402, capture gamma spectrum data for one or more capture gamma spectrums generated downhole in the wellbore is accessed. Capture gamma spectrum data for a generated capture gamma spectrum can include applicable data related to the capture gamma spectrum. Specifically, capture gamma spectrum data can include raw data of counts per energy channels. Further, capture gamma spectrum data can include processed data of a capture gamma spectrum, e.g. a normalized capture gamma spectrum.

Either or both the inelastic gamma spectrum data accessed at step 400 and the capture gamma spectrum data accessed at step 402 can be generated through an applicable number of detectors. Specifically, either or both the inelastic gamma spectrum data accessed at step 400 and the capture gamma spectrum data accessed at step 402 can be generated through multiple detectors. More specifically, either or both the inelastic gamma spectrum data and the capture gamma spectrum data can be generated through one or more near spaced detectors and one or more far spaced detectors.

At step 404, an assisted-physics based model that accounts for holdup measurements is applied to both the inelastic and capture gamma spectrum data to identify a compensated oil saturation for a formation. A compensated oil saturation for a formation, as used herein, can include one or more oil saturation measurements for the formation that are corrected to account for or otherwise remove holdup effects from the measurements. In accounting for holdup measurements, the assisted-physics based model can be applied to correct for holdup in a resultant oil saturation quantification, without actually calculating the holdup. Specifically, the assisted-physics based model can be applied to identify a compensated oil saturation without compensating either or both the inelastic gamma spectrum data and the capture gamma spectrum data. This is advantageous over current oil saturation derivation techniques that rely on actually calculating holdup and then correcting an oil saturation measurement based on the calculated holdup. Specifically, by accounting for the holdup to calculate oil saturation using an assisted-physics model or a machine learning model, as will be discussed in greater detail later, complexities of the process of calculating oil saturation can be reduced. For example, the need to measure, calculate, and environmentally correct for holdup can be eliminated from the process of calculating oil saturation. In turn, this can reduce processing time and computational resources needed in calculating oil saturation levels. Further, accuracy in the resultant oil saturation measurements can be improved.

The assisted-physics model can include one or more functions that map gamma spectrum measurements to compensated oil saturation measurements. Specifically, an assisted-physics analytical function can use linear and nonlinear combinations of log, exp, and higher order terms to match to compensated oil saturation measurements. The assisted-physics function can be a reduced function with respect to input measurements. For example, the assisted-physics function can include ratios of count rates or combinations of multiple peaks from the gamma spectrums.

In accounting for holdup based on gamma spectrums, both the assisted-physics model, as described with respect to FIG. 4, and other applicable models, such as machine learning models that will be discussed in greater detail later, can map features of gamma spectrums to holdup. As follows, such features can uniquely correlate holdup to gamma spectrum measurements. Specifically, such features can uniquely correlate holdup to gamma spectrum measurements irrespective of either or both formation variations and borehole variations. For example, features in a gamma spectrum that correspond to or otherwise related to hydrogen, oxygen, and carbon elemental concentrations can be used in models to account for holdup without actually being used to calculate holdup.

Phenomenologically, each measurement in a gamma spectrum is unique for each holdup. However, it is often necessary to reduce the number of features when the measurement is statistical in nature. Therefore, specific dominant features in relation to holdup can be used to account for holdup in models. For example, one or a combination of characteristics gamma peaks, ratios, algebraic expressions of rations, entire spectrums, spectral vectors, decay spectrums, decay constants, differential attenuations, and electron density indexes can be features that are used to account for holdup in the models.

The assisted-physics based model can be generated based on inelastic gamma spectrums induced by one or more radiation sources in one or more wellbores and capture gamma spectrums induced by one or more radiation sources in one or more wellbores. Such spectrums can be actually generated in the wellbores or simulated for the wellbores. Further, the spectrums can be generated across a plurality of different wellbores. Specifically, the assisted-physics based model can be generated by constructing a correlation between the inelastic gamma spectrums and capture gamma spectrums indicated by the one or more radiation sources, be it simulated or actually induced, and characteristics of radiation emitted by the one or more radiation sources. Characteristics of radiation emitted by the one or more radiation sources include applicable features that define the radiation for generating the gamma spectrums. For example, specific energy counts at specific channels in a gamma spectrum can be correlated to a specific energy of neutrons used in inducing the gamma spectrum.

In generating the assisted-physics based model based on both inelastic gamma spectrums and capture gamma spectrums generated by one or more radiation sources, the model can be generated based on known characteristics of formations in which the gamma spectrums are generated. Characteristics of formations, as used herein, include applicable features of a formation that affect generation of a gamma spectrum. Specifically, characteristics of formations can include formation lithology, formation porosity, and formation saturation. By generating the model to account for formation variation, oil saturation measurements that more accurately account for holdup can be generated through application of the model.

Further, in generating the assisted-physics model based on both inelastic gamma spectrums and capture gamma spectrums induced by one or more radiation sources, the model can be generated based on known characteristics of the one or more wellbores in which the spectrums are generated, be it actually or by simulation. Characteristics of wellbores, as used herein, include applicable features associated with a wellbore that affect generation of a gamma spectrum. Specifically, characteristics of a wellbore can include tool position within a wellbore, borehole size, casing size, and tool standoff. For example, borehole size, casing size, and tool standoff can be parametrized to form alpha, beta, and gamma matrixes for integration and interpolation to generate the model.

Additionally, in generating the assisted-physics model based on both inelastic gamma spectrums and capture gamma spectrums induced by one or more radiation sources, the model can be generated based on known characteristics of the one or more radiation sources. Characteristics of radiations sources, as used herein, include applicable features associated with a radiation source that affect generation of a gamma spectrum in a formation. Specifically, characteristics of radiation sources can include characteristics of the radiation sources themselves and characteristics of radiation emitted by the radiation sources that affect gamma spectrum generation. For example, characteristics of a radiation source can include a position of the radiation source, an operating voltage of the radiation source, and an energy of radiation emitted by the radiation source.

Figure 5:
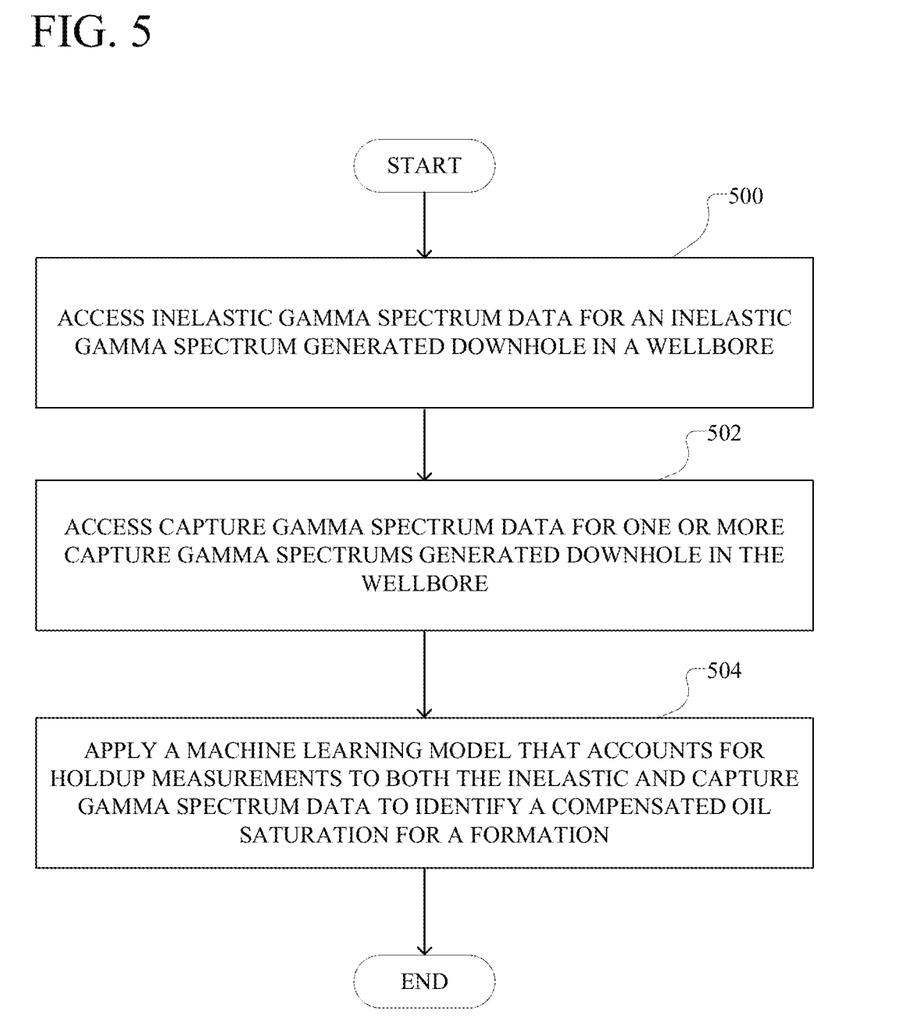
FIG. 5 illustrates a flowchart for an example method of identifying holdup compensated oil saturation for a formation through a machine learning model applied to both inelastic and capture gamma spectrums, in accordance with various aspects of the subject technology.

FIG. 5 illustrates a flowchart for an example method of identifying holdup compensated oil saturation for a formation through a machine learning model applied to both inelastic and capture gamma spectrums, in accordance with various aspects of the subject technology. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated. Each module shown in FIG. 4 represents one or more steps, processes, methods or routines in the method.

At step 500, inelastic gamma spectrum data for an inelastic gamma spectrum generated downhole in a wellbore is accessed. At step 502, capture gamma spectrum data for one or more capture gamma spectrums generated downhole in the wellbore is accessed. Either or both the inelastic gamma spectrum data accessed at step 500 and the capture gamma spectrum data accessed at step 502 can be generated through an applicable number of detectors. Specifically, either or both the inelastic gamma spectrum data accessed at step 500 and the capture gamma spectrum data accessed at step 502 can be generated through multiple detectors. More specifically, either or both the inelastic gamma spectrum data and the capture gamma spectrum data can be generated through one or more near spaced detectors and one or more far spaced detectors.

At step 504, a machine learning model that accounts for holdup measurements is applied to both the inelastic and capture gamma spectrum data to identify a compensated oil saturation for a formation. The machine learning model can be built on an applicable type of machine learning architecture that is capable of identifying oil saturation for a formation while accounting for holdup. For example, the machine learning model can be built on a neural network architecture. A neural network for building the machine learning model can include simple linear or nonlinear neural layers with different activation functions. Further, the neural network can include multi-layer perceptron, linear, nonlinear, logistic regressions. The same benefits as previously discussed with the assisted-physics based model example can be achieved through application of the machine learning model according to the techniques described herein. Specifically, by accounting for holdup in oil saturation measurements without actually calculating the holdup, application of the machine learning model can lead to improved accuracy at reduced resource consumption.

An entire spectrum, be it capture or inelastic, generated from multiple detectors can be used as input to the machine learning model to determine holdup compensated formation saturation. Specifically, spectral data can be used as input features for the model. Further, spectral data can be used to construct a spectral image. In turn, the spectral image can be used to train the machine learning model, e.g. deep learning neural networks. Additionally, the machine learning model can be trained using some or all of the same data that is used to generate the assisted-physics model, as is previously described with respect to FIG. 4.

A capture gamma spectrum that is used as input to either of both a machine learning model, as described with respect to FIG. 5, and an assisted-physics model, as described with respect to FIG. 4, can include either a time-instance spectrum or a time-decay spectrum of capture gamma measurements. Further, a capture gamma spectrum that is used to train a machine learning model or to generate an assisted-physics model can include either a time-instance spectrum or a time-decay spectrum of capture gamma measurements. A time-instance spectrum is a spectrum where measurements in a gamma spectrum are gathered as they exist in the spectrum within a specific time-instance, e.g. either a time window or specific point in time. A time-decay spectrum of capture gamma measurements is a spectrum of measurements as they decay over time.

Figure 6:
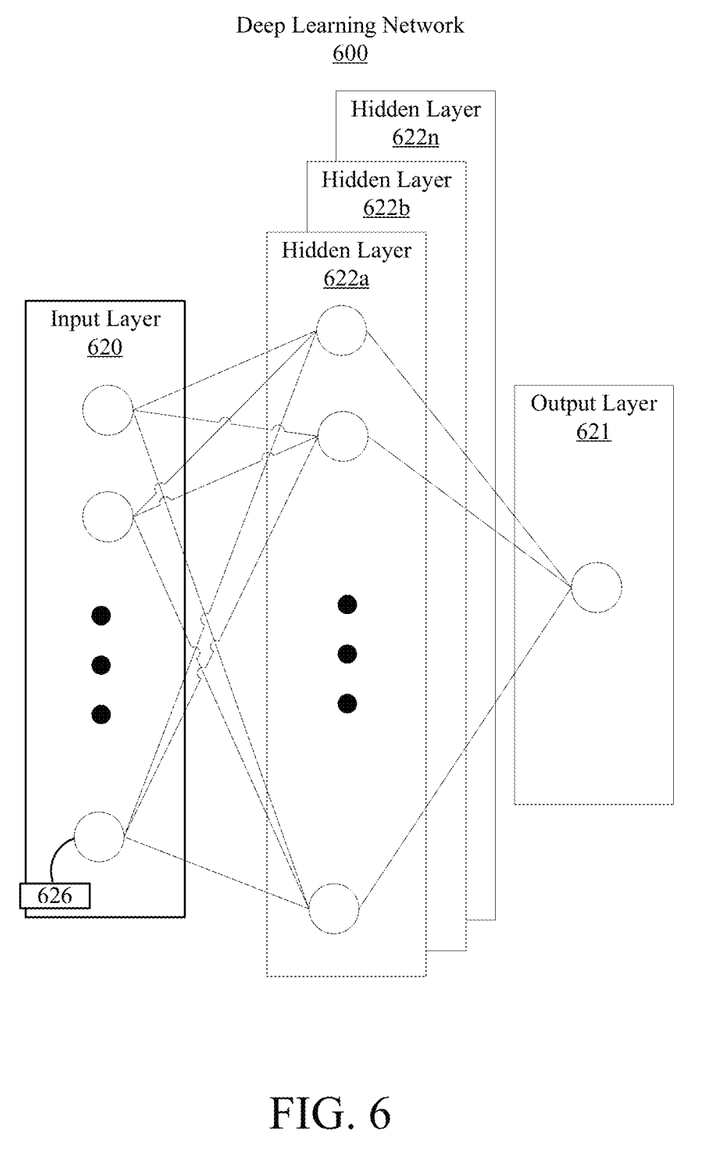
FIG. 6 is an illustrative example of a deep learning neural network, in accordance with various aspects of the subject technology.

The disclosure now turns to a further discussion of models that can be used through the environments and techniques described herein. Specifically, FIG. 6 is an illustrative example of a deep learning neural network 600 that can be implemented to identify circumstances associated with a likelihood that a provider will contact an enterprise product provider based on context information. An input layer 620 includes input data. In one illustrative example, the input layer 620 can include context information associated with a product provider provisioning a product. The neural network 600 includes multiple hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. The neural network 600 further includes an output layer 621 that provides an output resulting from the processing performed by the hidden layers 622a, 622b, through 622n. In one illustrative example, the output layer 621 can provide a classification for an object in an input video frame. The classification can include a class identifying the type of activity (e.g., playing soccer, playing piano, listening to piano, playing guitar, etc.).

The neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the first hidden layer 622a can transform the information of each input node by applying activation functions to the input node information. The information derived from the transformation can then be passed to and can activate the nodes of the next hidden layer 622b, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 621, at which an output is provided. In some cases, while nodes (e.g., node 626) in the neural network 600 are shown as having multiple output lines, a node can have a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622a, 622b, through 622n in order to provide the output through the output layer 621.

In some cases, the neural network 600 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training data until the neural network 600 is trained well enough so that the weights of the layers are accurately tuned.

As noted above, for a first training iteration for the neural network 600, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 600 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $E\_total=\Sigma(\frac{1}{2}(target-output)^2)$. The loss can be set to be equal to the value of E_total.

The loss (or error) will be high for the first training images since the actual values will be much different than the predicted output. The goal of training is to minimize the amount of loss so that the predicted output is the same as the training label. The neural network 600 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w\_i-\eta \, dL/dW$, where w denotes a weight, wi denotes the initial weight, and q denotes a learning rate. The learning rate can be set to any suitable value, with a high learning rate including larger weight updates and a lower value indicating smaller weight updates.

The neural network 600 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 600 can include any other deep network other than a CNN, such as an autoencoder, a deep belief nets (DBNs), a Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 7:
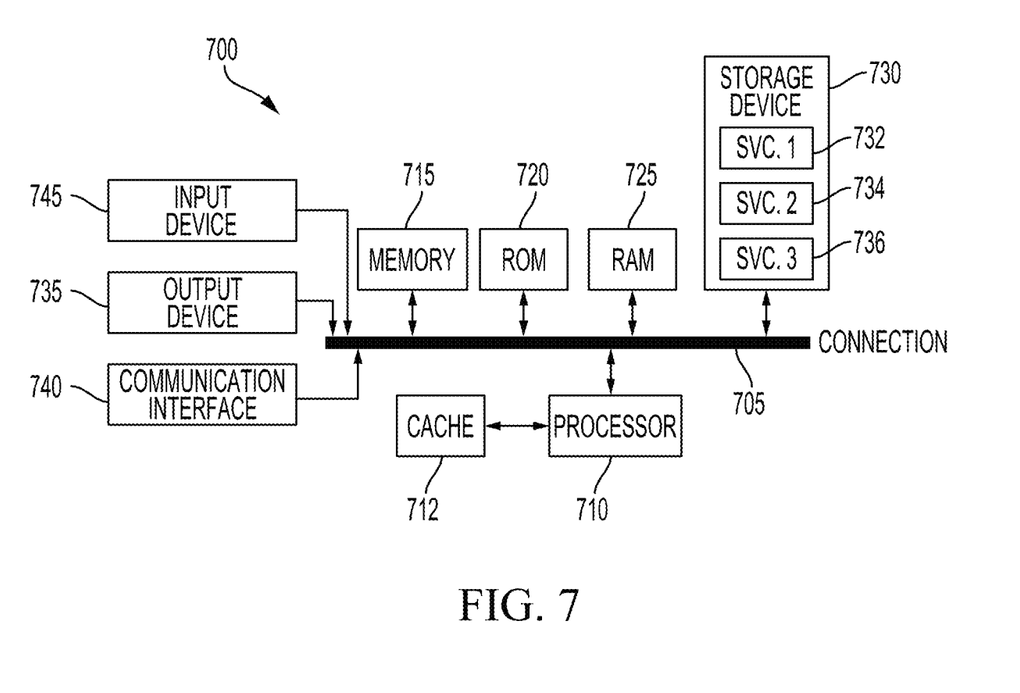
FIG. 7 illustrates an example computing device architecture, in accordance with various aspects of the subject technology.

FIG. 7 illustrates an example computing device architecture 700, which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 7 illustrates an example computing device architecture 700 of a computing device which can implement the various technologies and techniques described herein. For example, the computing device architecture 700 can implement a gain control system or control system. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A method comprising accessing inelastic gamma spectrum data for an inelastic gamma spectrum generated downhole in a wellbore. The method also includes accessing capture gamma spectrum data for one or more capture gamma spectrums generated downhole in the wellbore. Further, the method includes applying a model that accounts for holdup measurement to both the inelastic gamma spectrum data and the capture gamma spectrum data to identify a compensated oil saturation for a formation surrounding at least a portion of the wellbore based on both the inelastic gamma spectrum and the one or more capture gamma spectrums.

Statement 2. The method of statement 1, wherein the model is applied to identify the compensated oil saturation without actually calculating the holdup measurement.

Statement 3. The method of statements 1 and 2, wherein the model is applied to identify the compensated oil saturation without compensating either or both the inelastic gamma spectrum data and the capture gamma spectrum data with a calculated holdup measurement to identify the compensated oil saturation.

Statement 4. The method of statements 1 through 3, wherein the model is an assisted-physics based model.

Statement 5. The method of statements 1 through 4, wherein the assisted-physics based model is generated based on inelastic gamma spectrums induced by one or more radiation sources in one or more wellbores, capture gamma spectrums induced by the one or more radiation sources in the one or more wellbores, and characteristics of radiation generated by the one or more radiation sources to induce the inelastic gamma spectrums and the capture gamma spectrums.

Statement 6. The method of statements 1 through 5, wherein the assisted-physics based model is generated based on known characteristics of one or more formations surrounding the one or more wellbores, known characteristics of the one or more wellbores, and known characteristics of the one or more radiation sources.

Statement 7. The method of statements 1 through 6, wherein the assisted-physics based model is generated by constructing a correlation between the inelastic gamma spectrums, the capture gamma spectrums, and the characteristics of the radiation emitted by the one or more radiation source based on one or a combination of the known characteristics of the one or more formations, the known characteristics of the one or more wellbores, and the known characteristics of the one or more radiation sources.

Statement 8. The method of statements 1 through 7, wherein the model is a machine learning model that is generated based on inelastic gamma spectrums induced by one or more radiation sources in one or more wellbores, capture gamma spectrums induced by the one or more radiation sources in the one or more wellbores, and characteristics of radiation emitted by the one or more radiation sources to induce the inelastic gamma spectrums and the capture gamma spectrums.

Statement 9. The method of statements 1 through 8, wherein the inelastic gamma spectrum data and the capture gamma spectrum data is generated by a plurality of detectors disposed in the wellbore.

Statement 10. The method of statements 1 through 9, wherein the capture gamma spectrum data includes either or both a time-instance spectrum and a time-decay spectrum of capture gamma measurements.

Statement 11. A system comprising one or more processors and a computer-readable medium comprising instructions stored therein, which when executed by the one or more processors, cause the one or more processors to access inelastic gamma spectrum data for an inelastic gamma spectrum generated downhole in a wellbore. The instructions can also cause the one or more processors to access capture gamma spectrum data for one or more capture gamma spectrums generated downhole in the wellbore. Further, the instructions can cause the one or more processors to apply a model that accounts for holdup measurement to both the inelastic gamma spectrum data and the capture gamma spectrum data to identify a compensated oil saturation for a formation surrounding at least a portion of the wellbore based on both the inelastic gamma spectrum and the one or more capture gamma spectrums.

Statement 12. The system of statement 11, wherein the model is applied to identify the compensated oil saturation without actually calculating the holdup measurement.

Statement 13. The system of statements 11 and 12, wherein the model is applied to identify the compensated oil saturation without compensating either or both the inelastic gamma spectrum data and the capture gamma spectrum data with a calculated holdup measurement to identify the compensated oil saturation.

Statement 14. The system of statements 11 through 13, wherein the model is an assisted-physics based model.

Statement 15. The system of statements 11 through 14, wherein the assisted-physics based model is generated based on inelastic gamma spectrums induced by one or more radiation sources in one or more wellbores, capture gamma spectrums induced by the one or more radiation sources in the one or more wellbores, and characteristics of radiation emitted by the one or more radiation sources to induce the inelastic gamma spectrums and the capture gamma spectrums.

Statement 16. The system of statements 11 through 15, wherein the assisted-physics based model is generated by constructing a correlation between the inelastic gamma spectrums, the capture gamma spectrums, and the characteristics of the radiation emitted by the one or more radiation source based on known characteristics of the one or more formations, known characteristics of the one or more wellbores, and known characteristics of the one or more radiation sources.

Statement 17. The system of statements 11 through 16, wherein the model is a machine learning model that is generated based on inelastic gamma spectrums induced by one or more radiation sources in one or more wellbores, capture gamma spectrums induced by the one or more radiation sources in the one or more wellbores, and characteristics of radiation emitted by the one or more radiation sources to induce the inelastic gamma spectrums and the capture gamma spectrums.

Statement 18. The system of statements 11 through 17, wherein the inelastic gamma spectrum data and the capture gamma spectrum data is generated by a plurality of detectors disposed in the wellbore.

Statement 19. The system of statements 11 through 18, wherein the capture gamma spectrum data includes either or both a time-instance spectrum and a time-decay spectrum of capture gamma measurements.

Statement 20. A non-transitory computer-readable storage medium having stored therein instructions which, when executed by one or more processors, cause the one or more processors to access inelastic gamma spectrum data for an inelastic gamma spectrum generated downhole in a wellbore. The instructions which, when executed by the one or more processors, further cause the one or more processors to access capture gamma spectrum data for one or more capture gamma spectrums generated downhole in the wellbore. Further, the instructions which, when executed by the one or more processors, cause the one or more processors to access capture gamma spectrum data for one or more capture gamma spectrums generated downhole in the wellbore. Further, the instructions can cause the one or more processors to apply a model that accounts for holdup measurement to both the inelastic gamma spectrum data and the capture gamma spectrum data to identify a compensated oil saturation for a formation surrounding at least a portion of the wellbore based on both the inelastic gamma spectrum and the one or more capture gamma spectrums.

The disclosures shown and described above are only examples. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the embodiments described above can be modified within the scope of the appended claims.

What is claimed is:
1. A method comprising:
   accessing inelastic gamma spectrum data for an inelastic gamma spectrum generated downhole in a wellbore;

accessing capture gamma spectrum data for one or more capture gamma spectrums generated downhole in the wellbore;

applying a model that accounts for holdup measurement to both the inelastic gamma spectrum data and the capture gamma spectrum data to identify a compensated oil saturation for a formation surrounding at least a portion of the wellbore based on both the inelastic gamma spectrum and the one or more capture gamma spectrums.

2. The method of claim 1, wherein the model is applied to identify the compensated oil saturation without actually calculating the holdup measurement.

3. The method of claim 2, wherein the model is applied to identify the compensated oil saturation without compensating either or both the inelastic gamma spectrum data and the capture gamma spectrum data with a calculated holdup measurement to identify the compensated oil saturation.

4. The method of claim 1, wherein the model is an assisted-physics based model.

5. The method of claim 4, wherein the assisted-physics based model is generated based on inelastic gamma spectrums induced by one or more radiation sources in one or more wellbores, capture gamma spectrums induced by the one or more radiation sources in the one or more wellbores, and characteristics of radiation generated by the one or more radiation sources to induce the inelastic gamma spectrums and the capture gamma spectrums.

6. The method of claim 5, wherein the assisted-physics based model is generated based on known characteristics of one or more formations surrounding the one or more wellbores, known characteristics of the one or more wellbores, and known characteristics of the one or more radiation sources.

7. The method of claim 6, wherein the assisted-physics based model is generated by constructing a correlation between the inelastic gamma spectrums, the capture gamma spectrums, and the characteristics of the radiation emitted by the one or more radiation source based on:
the known characteristics of the one or more formations;
the known characteristics of the one or more wellbores; and
the known characteristics of the one or more radiation sources.

8. The method of claim 1, wherein the model is a machine learning model that is generated based on inelastic gamma spectrums induced by one or more radiation sources in one or more wellbores, capture gamma spectrums induced by the one or more radiation sources in the one or more wellbores, and characteristics of radiation emitted by the one or more radiation sources to induce the inelastic gamma spectrums and the capture gamma spectrums.

9. The method of claim 1, wherein the inelastic gamma spectrum data and the capture gamma spectrum data is generated by a plurality of detectors disposed in the wellbore.

10. The method of claim 1, wherein the capture gamma spectrum data includes either or both a time-instance spectrum and a time-decay spectrum of capture gamma measurements.

11. A system comprising:
one or more processors; and
a computer-readable medium comprising instructions stored therein, which when executed by the one or more processors, cause the one or more processors to:
access inelastic gamma spectrum data for an inelastic gamma spectrum generated downhole in a wellbore;
access capture gamma spectrum data for one or more capture gamma spectrums generated downhole in the wellbore; and
apply a model that accounts for holdup measurement to both the inelastic gamma spectrum data and the capture gamma spectrum data to identify a compensated oil saturation for a formation surrounding at least a portion of the wellbore based on both the inelastic gamma spectrum and the one or more capture gamma spectrums.

12. The system of claim 11, wherein the model is applied to identify the compensated oil saturation without actually calculating the holdup measurement.

13. The system of claim 12, wherein the model is applied to identify the compensated oil saturation without compensating either or both the inelastic gamma spectrum data and the capture gamma spectrum data with a calculated holdup measurement to identify the compensated oil saturation.

14. The system of claim 11, wherein the model is an assisted-physics based model.

15. The system of claim 14, wherein the assisted-physics based model is generated based on inelastic gamma spectrums induced by one or more radiation sources in one or more wellbores, capture gamma spectrums induced by the one or more radiation sources in the one or more wellbores, and characteristics of radiation emitted by the one or more radiation sources to induce the inelastic gamma spectrums and the capture gamma spectrums.

16. The system of claim 15, wherein the assisted-physics based model is generated by constructing a correlation between the inelastic gamma spectrums, the capture gamma spectrums, and the characteristics of the radiation emitted by the one or more radiation source based on:
known characteristics of the one or more formations;
known characteristics of the one or more wellbores; and
known characteristics of the one or more radiation sources.

17. The system of claim 11, wherein the model is a machine learning model that is generated based on inelastic gamma spectrums induced by one or more radiation sources in one or more wellbores, capture gamma spectrums induced by the one or more radiation sources in the one or more wellbores, and characteristics of radiation emitted by the one or more radiation sources to induce the inelastic gamma spectrums and the capture gamma spectrums.

18. The system of claim 11, wherein the inelastic gamma spectrum data and the capture gamma spectrum data is generated by a plurality of detectors disposed in the wellbore.

19. The system of claim 11, wherein the capture gamma spectrum data includes either or both a time-instance spectrum and a time-decay spectrum of capture gamma measurements.

20. A gamma ray detector system comprising:
a downhole gamma ray detector; and
a processing unit configured to:
access inelastic gamma spectrum data for an inelastic gamma spectrum generated downhole in a wellbore through the gamma ray detector;
access capture gamma spectrum data for one or more capture gamma spectrums generated downhole in the wellbore through the gamma ray detector; and
apply a model that accounts for holdup measurement to both the inelastic gamma spectrum data and the capture gamma spectrum data to identify a compensated oil saturation for a formation surrounding at least a portion of the wellbore based on both the inelastic gamma spectrum and the one or more capture gamma spectrums.

* * * * *